US011912626B2

(12) United States Patent
Kaper et al.

(10) Patent No.: US 11,912,626 B2
(45) Date of Patent: Feb. 27, 2024

(54) BROWNMILLERITE-BASED POLYCRYSTALLINE FUSED PRODUCT

(71) Applicants: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

(72) Inventors: Helena Kaper, Courthezon (FR); Pierre-Alexis Repecaud, Saint-Martin de Fraigneau (FR)

(73) Assignees: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 396 days.

(21) Appl. No.: 17/275,539

(22) PCT Filed: Sep. 19, 2019

(86) PCT No.: PCT/FR2019/052191
§ 371 (c)(1),
(2) Date: Mar. 11, 2021

(87) PCT Pub. No.: WO2020/058638
PCT Pub. Date: Mar. 26, 2020

(65) Prior Publication Data
US 2022/0033310 A1   Feb. 3, 2022

(30) Foreign Application Priority Data
Sep. 20, 2018 (FR) ...................... 1858500

(51) Int. Cl.
*C04B 35/26* (2006.01)
*B01J 23/78* (2006.01)
*B01J 35/02* (2006.01)
*C04B 35/653* (2006.01)
*H01M 4/90* (2006.01)
*H01M 8/12* (2016.01)

(52) U.S. Cl.
CPC ........... *C04B 35/2683* (2013.01); *B01J 23/78* (2013.01); *B01J 35/026* (2013.01); *C04B 35/653* (2013.01); *H01M 4/9033* (2013.01); *H01M 4/9075* (2013.01); *C04B 2235/3274* (2013.01); *C04B 2235/95* (2013.01); *H01M 2008/1293* (2013.01)

(58) Field of Classification Search
CPC . H01M 4/9025; H01M 4/9033; H01M 4/9075
See application file for complete search history.

(56) References Cited

U.S. PATENT DOCUMENTS

| 2005/0201919 A1* | 9/2005 | Yu ............................. C01G 3/00 429/495 |
| 2006/0292066 A1* | 12/2006 | Pez ........................... C01B 3/38 423/648.1 |
| 2016/0344037 A1* | 11/2016 | Tsuji ................... H01M 4/9016 |
| 2017/0098841 A1* | 4/2017 | Higashino ........... H01M 4/9058 |
| 2018/0093229 A1* | 4/2018 | Yildiz .................. B01D 71/024 |

FOREIGN PATENT DOCUMENTS

| CN | 1315920 A | 10/2001 |
| CN | 102836719 B | 8/2015 |
| JP | 2002-520248 A | 7/2002 |
| JP | 2006-108598 A | 4/2006 |
| JP | 2009-518173 A | 5/2009 |
| JP | 2018-070394 A | 5/2018 |
| JP | 2018-118193 A | 8/2018 |
| WO | WO 00/03947 A1 | 1/2000 |

OTHER PUBLICATIONS

Ceretti, M., et al., "Growth and characterization of large high quality brownmillerite $CaFeO_{2.5}$ single crystals," CrystEngComm, vol. 14, No. 18, Jan. 2012, pp. 5771-5776.

Singh, S. K., et al., "Ac conductivity, dielectric losses, permittivity behavior of $Ba_xSr_{1-x}Fe_{0.8}Co_{0.2}O_{3-\delta}$ (x = 0, 0.5 and 1) ceramics," Journal of Materials Science, vol. 42, No. 6, Feb. 2007, pp. 2105-2111.

Maity, A., et al., "Solid-state reactivity explored in situ by synchrotron radiation on single crystals: from $SrFeO_{2.5}$ to $SrFeO_3$ via electrochemical oxygen intercalation," Journal of Physics D.: Applied Physics, vol. 48, No. 50, Dec. 2015, 14 pages.

Singh, S., et al., "Preferentially oriented single crystal growth of brownmillerite $CaFeO_{2.5}$ by flux growth technique," Materials Letters, vol. 131, Jun. 2014, pp. 332-335.

International Search Report as issued in International Patent Application No. PCT/FR2019/052191, dated Dec. 3, 2019.

(Continued)

Primary Examiner — Jeremiah R Smith
(74) Attorney, Agent, or Firm — Pillsbury Winthrop Shaw Pittman LLP

(57) ABSTRACT

A polycrystalline fused product based on brownmillerite, includes, for more than 95% of its weight, of the elements Ca, Sr, Fe, O, M and M', the contents of the elements being defined by the formula $X_yM_zFe_tM'_uO_{2.5}$, wherein the atomic indices are such that $0.76 \leq y \leq 1.10$, $z \leq 0.21$, $0.48 \leq t \leq 1.15$ and $u \leq 0.52$, $0.95 \leq y+z \leq 1.10$, and $0.95 \leq t+u \leq 1.10$, X being Ca or Sr or a mixture of Ca and Sr, M being an element chosen from the group formed by La, Ba and mixtures thereof, M' being an element chosen from the group formed by Ti, Cu, Gd, Mn, Al, Sc, Ga, Mg, Ni, Zn, Pr, In, Co, and mixtures thereof, the sum of the atomic indices of Ti and Cu being less than or equal to 0.1.

17 Claims, No Drawings

(56) References Cited

OTHER PUBLICATIONS

Ceretti, M., et al., "*Influence of Phase Transformations on Crystal Growth of Stoichiometric Brownmillerite Oxides: $Sr_2ScGaO_5$ and $Ca_2Fe_2O_5$*", Crystals, vol. 6, (2016), 11 pages.

Schreiner, W. N., "*A standard test method for the determination of RIR values by x-ray diffraction*", Powder Diffraction, vol. 10, No. 1, Mar. 1995, pp. 25-33.

Office Action as issued in Japanese Patent Application No. 2021-512865, dated May 9, 2023.

* cited by examiner

BROWNMILLERITE-BASED POLYCRYSTALLINE FUSED PRODUCT

CROSS-REFERENCE TO RELATED APPLICATIONS

This application is the U.S. National Stage of PCT/FR2019/052191, filed Sep. 19, 2019, which in turn claims priority to French patent application number 1858500 filed Sep. 20, 2018. The content of these applications are incorporated herein by reference in their entireties.

The invention relates to polycrystalline materials based on brownmillerite, of chemical formula $X_yM_zFe_tM'_uO_{2.5}$, X being Ca or Sr or a mixture of Ca and Sr, in particular intended for use wherein oxygen transport is required, in particular as a membrane for oxygen separation, such as an electrode for a solid oxide fuel cell (SOFC), as a catalyst support, or even as a catalyst.

Products of generic formula $CaFeO_{2.5}$ and $SrFeO_{2.5}$ are conventionally referred to as "calcium iron brownmillerite" and "strontium iron brownmillerite", respectively, the $CaFeO_{2.5}$ or $SrFeO_{2.5}$ brownmillerite phase optionally being doped with a dopant M and/or M', with the aim of improving the ionic conductivity and/or the sintering ability and/or the thermal and/or chemical stability. The dopant M may be in particular Ba, La or a mixture of these elements, and the dopant M' may be Ti, Cu, Gd, Mn, Al, Sc, Ga, Mg, Ni, Zn, Pr, In, Co or a mixture of these elements.

These brownmillerites are generally produced by the following processes:
- sol-gel, in particular by the Pechini process,
- solid sintering synthesis,
- self-combustion.

A single crystal of $CaFeO_{2.5}$ brownmillerite produced by means of the floating zone method, as described in "*Influence of Phase Transformations on Crystal Growth of Stoichiometric Brownmillerite Oxides: $Sr_2ScGaO_5$ and $Ca_2Fe_2O_5$*", Ceretti et al., Crystals, Vol. 6, 2016, pp 146, is also known.

Finally, the use of these materials as a catalyst support is known.

There is a need to achieve very high degrees of conversion at reaction temperatures that are as low as possible.

An object of the invention is to at least partially meet this need.

According to the invention, this objective is achieved by means of a polycrystalline fused product based on brownmillerite, consisting, for more than 95% of its weight, of the elements Ca, Sr, Fe, O, M and M', the contents of said elements in said fused product being defined by the formula $X_yM_zFe_tM'_uO_{2.5}$, wherein the atomic indices are such that $0.76 \leq y \leq 1.10$, $z \leq 0.21$, $0.48 \leq t \leq 1.10$, $u \leq 0.52$, $0.95 \leq y+z \leq 1.10$, and $0.95 \leq t+u \leq 1.10$, X being Ca or Sr or a mixture of Ca and Sr, M being an element chosen from the group formed by La, Ba and mixtures thereof, M' being an element chosen from the group formed by Ti, Cu, Gd, Mn, Al, Sc, Ga, Mg, Ni, Zn, Pr, In, Co, and mixtures thereof, the sum of the atomic indices of Ti and Cu being less than or equal to 0.1.

In other words, the summed contribution of Ti and of Cu to the index u in the above formula is less than or equal to 0.1.

Of course, $0 \leq z$ and $0 \leq u$.

In one embodiment, said elements other than Ca, Sr, Fe, M and M' are more than 95%, more than 99%, or even substantially 100% by weight, in the form of oxides.

Surprisingly, such products have proven to be very suitable for constituting a catalyst support making it possible to obtain high degrees of conversion at low temperature. The catalysis supports comprising or consisting of the products according to the invention are in particular notable in that the temperature required to reach a degree of conversion equal to 50% in a reaction for the oxidation of CO to $CO_2$ is systematically less than the temperature required to achieve this same degree with a support of the same composition obtained by means of a process other than melting. This property even appears to constitute a signature of the products according to the invention.

Under the effect of melting, then cooling, the elements Ca, Sr, Fe, M, M' and O combine together in the form of at least one brownmillerite phase, or even other minor phases containing calcium and/or iron and/or strontium, in particular FeO, CaO, $CaCO_3$, Fe, $Fe_2O_3$ and $SrCO_3$.

Preferably, a product according to the invention also comprises one, and preferably several, of the following optional characteristics:
- $0.85 \leq y \leq 1.05$ and/or $z \leq 0.15$ and/or $0.75 \leq t \leq 1.05$ and/or $u \leq 0.25$,
- the content of brownmillerite phase(s) (i.e. the weight percentage of brownmillerite phase(s) on the basis of all of the crystalline phases present in the fused product) is greater than 50%, more preferably is greater than 55%,
- $z=0$,
- $u=0$,
- $z=0$ and $u=0$,
- the element M' is chosen from Ti, Cu, Ni, Co, Mn and mixtures thereof,
- in the formulation $X_yM_zFe_tM'_uO_{2.5}$, if x represents the proportion of Sr and (1–x) the relative proportion of Ca in the formula $(Ca_{(1-x)}Sr_x)_yM_zFe_tM'_uO_{2.5}$, $0<x \leq 0.1$, $0.9 \leq y \leq 1.05$, $0.1 \geq z \geq 0.01$, $y+z \leq 1.10$, $t \geq 0.8$, $0.01 \leq u \leq 0.2$, $t+u \leq 1.10$, and the total weight content of elements other than Ca, Sr, Fe, M, M' and O is less than 3% as a percentage on the basis of the weight of the product,
- in the formulation $X_yM_zFe_tM'_uO_{2.5}$, if x represents the proportion of Sr and (1–x) the relative proportion of Ca in the formula $(Ca_{(1-x)}Sr_x)_yM_zFe_tM'_uO_{2.5}$, $x=0$, $0.9 \leq y \leq 1.05$, $0.1 \geq z \geq 0.01$, $y+z \leq 1.10$, $t \geq 0.8$, $0.01 \leq u \leq 0.2$, $t+u \leq 1.10$, and the total weight content of elements other than Ca, Sr, Fe, M, M' and O is less than 3% as a percentage on the basis of the weight of the product,
- in the formulation $X_yM_zFe_tM'_uO_{2.5}$, if x represents the proportion of Sr and (1–x) the relative proportion of Ca in the formula $(Ca_{(1-x)}Sr_x)_yM_zFe_tM'_uO_{2.5}$, $1>x \geq 0.9$, $0.9 \leq y \leq 1.05$, $0.1 \geq z \geq 0.01$, $y+z \leq 1.10$, $t \geq 0.8$, $0.01 \leq u \leq 0.2$, $t+u \leq 1.10$, and the total weight content of elements other than Ca, Sr, Fe, M, M' and O is less than 3% as a percentage on the basis of the weight of the product,
- in the formulation $X_yM_zFe_tM'_uO_{2.5}$, if x represents the proportion of Sr and (1–x) the relative proportion of Ca in the formula $(Ca_{(1-x)}Sr)_yM_zFe_tM'_uO_{2.5}$, $x=1$, $0.9 \leq y \leq 1.05$, $0.1 \geq z \geq 0.01$, $y+z \leq 1.10$, $t \geq 0.8$, $0.01 \leq u \leq 0.2$, $t+u \leq 1.10$, and the total weight content of elements other than Ca, Sr, Fe, M, M' and O is less than 3% as a percentage on the basis of the weight of the product.

The invention also relates to a powder comprising more than 90% or even 100% by weight of particles in a fused product as described above. Such a powder has a median size $D_{50}$ of greater than 0.1 μm and less than 4 mm.

Advantageously, these optional characteristics improve the catalytic properties, making the products according to the invention particularly suitable, after optional milling, as a catalyst support or catalyst.

The invention also relates to a powder comprising more than 90% by weight, or even more than 95%, or even substantially 100% of particles in a product according to the invention.

The invention also relates to a production process comprising the following steps:
a) mixing starting materials so as to form a starting feedstock suitable for obtaining, at the end of step c), a product according to the invention,
b) melting the starting feedstock until a liquid mass is obtained,
c) cooling said liquid mass until complete solidification, so as to obtain a fused product according to the invention.

The invention also relates to a product that can be obtained by means of a process according to the invention.

Finally, the invention relates to a device chosen from an oxygen separation membrane, a catalytic membrane, an electrode for a solid oxide fuel cell, a catalyst support, a catalyst comprising or consisting of a product according to the invention, or of a powder according to the invention or of a product produced or that can be produced by means of a process according to the invention.

According to a first aspect, the invention relates to a catalytic support or catalyst comprising or consisting of a fused product as described above, or of a powder as described above, or else of a product produced by means of a process as described above.

According to another aspect, the invention relates to an oxygen separation membrane comprising or consisting of a fused product as described above, or of a powder as described above, or of a product produced by means of a process as described above.

According to another aspect, the invention relates to an electrode for a solid oxide fuel cell SOFC, comprising or consisting of a fused product as described above, or of a powder as described above, or else of a product produced by means of a process as described above.

A distinction should be made between a product of which the chemical composition is given by the formula $X_y M_z Fe_t M'_u O_{2.5}$ and a phase of formula $X_y M_z Fe_t M'_u O_{2.5}$, wherein this formula indicates the crystallographic structure of said phase.

In a product according to the invention, various phases are possible, and in particular one or more phases of formula $X_y M_z Fe_t M'_u O_{2.5}$, in particular $CaFeO_{2.5}$ and $SrFeO_{2.5}$.

The ICDD ("International Center for Diffraction Data") files 00-018-0286 and 01-070-5778 make it possible to identify the angular ranges of the diffraction peaks corresponding to the $CaFeO_{2.5}$ brownmillerite phase and to the $SrFeO_{2.5}$ brownmillerite phase, respectively.

The content of brownmillerite phase and of the possible secondary phases is determined as a weight percentage on the basis of all of the detectable crystalline phases present in a product according to the invention, from an X-ray pattern produced on a powder of said product, according to the usual RIR (Reference Intensity Ratio) method as described for example in the publications: "*A standard test method for the determination of RIR values by x-ray diffraction*", Walter N. Schreiner, Powder Diffraction, Vol. 10, No. 1, March 1995 or "*The Use of Reference Intensity Ratios in X-Ray Quantitative Analysis*", Robert L. Snyder, Powder Diffraction, Vol. 7, No. 4, December 1992.

The processing of the pattern obtained and the determination of the phases present in the product is carried out with the DIFFRAC EVA software and by means of the RIR method as indicated above. According to the protocol used, the intensities of the various phases are optimized to correspond as well as possible to the experimental diffraction pattern. The RIR method is performed using the ICDD files of the best possible quality available for all the detectable phases (such as those of which the reference was given above) and having in particular values of the ratio $I/I_{corundum}$, that is to say the ratio between the intensity of the signal of the ICDD file of a crystalline phase present in the product relative to a corundum sample used as standard.

To determine the overall content of brownmillerite phase in the product, the sum of the contents of the brownmillerite phases present, as determined by the RIR method, on the basis of the ICDD files of the corresponding phases, is considered according to the invention. In particular, if the brownmillerite phase(s) present correspond(s) to the generic formulation $[Ca_{(1-x)}Sr_x]_y M_z Fe_t M'_u O_{2.5}$ with $x \neq 0$ and $x \neq 1$, the cumulative contributions of all of the phases having a peak according to a diffraction angle $2\theta$ of between 11° and 12°, characteristic of the reflection on the plane [020] of said brownmillerite phase(s) will be considered. According to this measurement, the content of brownmillerite phase therefore takes into account all of the $Ca_{(1-x)}Sr_x FeO_{2.5}$ phases in brownmillerite crystallographic form, with $0 \leq x \leq 1$, wherein an element M and/or M' may be present. Likewise, the contribution and the content of the phases other than brownmillerite (termed secondary phases) is determined according to the same protocol as explained above and by the RIR method. The secondary phases are the phases detectable by X-ray diffraction other than the $CaFeO_{2.5}$ and $SrFeO_{2.5}$ brownmillerite phases. Among others, $FeO$, $Fe_2O_3$, $SrCO_3$, $CaCO_3$, $Fe$, $SrFeO_{2.75}$, $SrFeO_{2.875}$ or $CaO$ may be secondary phases identified on the X-ray diffraction pattern, in particular when the product $X_y M_z Fe_t M'_u O_{2.5}$ comprises no or substantially no element M and M'.

The detection and the identification of these phases is carried out on an X-ray diffraction pattern of said product, for example obtained by means of an X'Pert PRO diffractometer device from the company Panalytical provided with a copper XRD tube. The diffraction pattern is acquired using this equipment, over an angular range $2\theta$ of between 5° and 80°, with a step of 0.017°, and a counting time of 60 s/step. The front lens comprises a programmable divergence slit, used fixed, of ¼°, Soller slits of 0.04 rad, a mask equal to 10 mm and a fixed anti-scattering slit of ½°. The sample rotates about its own axis in order to limit the preferential orientations. The rear lens comprises a programmable anti-scattering slit, used fixed, of ¼°, Soller slits of 0.04 rad and a Ni filter.

The term "fused product" refers to a product obtained by melting a starting feedstock in the form of a liquid mass, then solidifying said liquid mass.

The term "particle" is intended to mean in particular a solid object which passes through a sieve with a square mesh having an opening equal to 10 mm.

The term "block" is intended to mean a solid object which is not a particle.

The term "median size" of a powder, denoted $D_{50}$, refers to the size of particles corresponding to a weight percentage of 50%, on the curve of cumulative particle size distribution of the sizes of particles of the powder, the particle sizes being classified in increasing order. The median size can be determined by means of a particle size distribution measured using a laser particle size analyzer.

The term "impurities" refers to the unavoidable constituents, unintentionally and necessarily introduced with the starting materials or resulting from reactions with these constituents. The impurities are not required constituents, but are merely tolerated.

The term "the most stable oxide of an element", is intended to mean the oxide of said element that is thermodynamically the most stable at 20° C.

The term "precursor" of a compound or of an element is intended to mean a constituent capable of providing said compound or element, respectively, during the implementation of a production process according to the invention.

Unless otherwise indicated, and in particular in the formulae $X_y M_z Fe_t M'_u O_{2.5}$ and $[Ca_{(1-x)}Sr_x]_y M_z Fe_t M'_u O_{2.5}$ wherein the indices x, y, z, t, u and 2.5 are atomic indices, all the contents of the constituents according to the invention are weight percentages expressed on the basis of the product.

The term "containing a" or "comprising a" is intended to mean "comprising at least one", unless otherwise indicated.

A fused product according to the invention is preferably obtained by melting a starting feedstock, casting the liquid mass, preferably in a mold or in the form of a thin stream, then solidifying.

An example of a process according to the invention is now described in detail.

The chemistry and the amount of brownmillerite phase, in particular the content of brownmillerite phase of a product according to the invention, depend in particular on the composition of the starting feedstock prepared in step a).

A starting feedstock which makes it possible to produce a fused product according to the invention is formed from compounds of calcium and/or of strontium, of iron, and optionally of element M and/or M', in particular in the form of oxides and/or of carbonates and/or of hydroxides, and/or of precursors of the calcium and/or strontium, iron and M and/or M' elements. The composition of the starting feedstock can be adjusted by addition of oxides or of mixtures of oxides and/or of precursors, in particular of CaO, $CaCO_3$, SrO, $SrCO_3$, $Fe_2O_3$, of oxide(s) of the elements M, of oxide(s) of the elements M', of carbonate(s) of the elements M, of carbonate(s) of the elements M', of hydroxide(s) of the elements M, of hydroxide(s) of the elements M'.

The use of oxides and/or of carbonates and/or of hydroxides improves the oxygen availability required for the formation of brownmillerite phase and for the electrical neutrality thereof, and is therefore preferred.

Preferably, at least one, or even all, of the elements iron, M and M' are introduced into the starting feedstock in the form of oxides. In one particular embodiment, oxide powders are used to provide the iron, M and M' elements, and a carbonate powder is used to provide the calcium element and/or the strontium element.

Preferably, the compounds providing the calcium and/or strontium, iron, M and M' elements are chosen from CaO, $CaCO_3$, SrO, $SrCO_3$, $Fe_2O_3$, oxide(s) of the elements M, oxide(s) of the elements M', carbonate(s) of the elements M, carbonate(s) of the elements M'.

Preferably, the compounds providing the calcium and/or strontium, iron, M and/or M' elements together represent more than 90%, preferably more than 99%, as weight percentages, of the constituents of the starting feedstock. Preferably, these compounds represent, together with the impurities, 100% of the constituents of the starting feedstock.

Preferably, no compound other than those providing the calcium and/or strontium, iron, M and/or M' elements, or even no compound other than CaO, $CaCO_3$, SrO, $SrCO_3$, $Fe_2O_3$, oxide(s) of the elements M, oxide(s) of the elements M', carbonate(s) of the elements M, carbonate(s) of the elements M', is intentionally introduced into the starting feedstock. In one embodiment, the sum of CaO, $CaCO_3$, SrO, $SrCO_3$, $Fe_2O_3$, of oxide(s) of the elements M, of oxide(s) of the elements M', of carbonate(s) of the elements M, of carbonate(s) of the elements M' and of the precursors thereof represents more than 99% by weight of the starting feedstock.

The amounts of calcium and/or of strontium, of iron, of the element M and of the element M' of the starting feedstock are mostly contained in the fused product produced. If a portion of the constituents can volatilize during the melting step, depending on the melting conditions, by virtue of their general knowledge, or by virtue of simple routine tests, those skilled in the art know how to adjust the amount of these constituents in the starting feedstock as a function of the content that they wish to find in the fused products, and of the melting conditions used.

In order to increase the brownmillerite content, it is preferable for the molar proportions of the calcium, strontium, iron, M and M' elements in the starting feedstock to be close to those of the brownmillerite fused product that it is desired to produce.

In order to produce a fused product according to the invention, it is preferable, in the starting feedstock, for the molar contents c, s, f, m and n of the calcium, strontium, iron, M and M' elements, respectively, as molar percentages on the basis of the sum of the contents c, s, f, m and n, to observe the following conditions:

$$k_1 \cdot [(1-x)^* y]/(x^* y) \le c/s \le k_2 \cdot [(1-x)^* y]/(x^* y), \text{ and/or}$$

$$k'_1 \cdot u/t \le n/f \le k'_2 \cdot u/t, \text{ and/or}$$

$$k''_1 \cdot z/t \le m/f \le k''_2 \cdot z/t, \text{ and/or}$$

$$k'''_1 \cdot [(1-x)^* y]/t \le c/f \le k'''_2 \cdot [(1-x)^* y]/t, \text{ and/or}$$

$$k''''_1 \cdot (x^* y)/t \le s/f \le k''''_2 \cdot (x^* y)/t,$$

wherein x, y, z, t and u can take the values defined in this description, in particular $0 \le x \le 1$, $0.76 \le y \le 1.10$, $z \le 0.21$, $0.48 \le t \le 1.10$, $u \le 0.52$, $0.95 \le y+z \le 1.10$, and $0.95 \le t+u \le 1.10$, and $k_1 \ge 0.9$, preferably $\ge 0.95$, and/or
$k'_1 \ge 0.9$, preferably $\ge 0.95$, and/or
$k''_1 \ge 0.9$, preferably $\ge 0.95$, and/or
$k'''_1 \ge 0.9$, preferably $\ge 0.95$, and/or
$k''''_1 \ge 0.9$, preferably $\ge 0.95$, and/or
$k_2 \le 1.1$, preferably $\le 1.05$, and/or
$k'_2 \le 1.1$, preferably $\le 1.05$, and/or
$k''_2 \le 1.1$, preferably $\le 1.05$, and/or
$k'''_2 \le 1.1$, preferably $\le 1.05$, and/or
$k''''_2 \le 1.1$, preferably $\le 1.05$.

Of course, these values of $k_1$, $k'_1$, $k''_1$, $k'''_1$, $k''''_1$, $k_2$, $k'_2$, $k''_2$, $k'''_2$ and $k''''_2$ are those to be adopted under established working conditions, that is to say outside the steps of transition between different compositions and outside the start-up steps. This is because, if the desired product involves a change of composition of the starting feedstock compared with that used to produce the previous product, it is necessary to take into account the residues of the previous product in the furnace. Those skilled in the art know however how to adjust the starting feedstock accordingly.

The particle sizes of the powders used in the starting feedstock may be those commonly encountered in melting processes.

An intimate mixture of the starting materials can be carried out in a mixer. This mixture is then poured into a melting furnace.

In step b), the starting feedstock is melted.

Use may for example be made of a Heroult arc furnace comprising two electrodes and the tank of which has a diameter of approximately 0.8 m and which can contain approximately 180 kg of molten liquid. Preferably, the energy is between 1500 and 2800 kWh/T, preferably between 1600 and 2300 kWh/T.

However, all known furnaces can be envisioned, such as an induction furnace, a plasma furnace or other types of Heroult furnace, provided that they make it possible to obtain a liquid mass.

It is also possible to carry out melting in a crucible in a heat treatment furnace, preferably in an electric furnace. Preferably, an arc furnace or an induction furnace, preferably an electric arc furnace, is used. Electrofusion in fact allows the production of large amounts of fused product with advantageous yields.

Preferably, a plasma torch is not used, neither is a heat gun. In particular, processes using a plasma torch or a heat gun do not always make it possible to produce molten particles. Even in the event of melting, they generally do not make it possible to produce molten particles with a size greater than 200 microns, and at the very least greater than 500 microns.

The melting can be carried out in a reducing, neutral or oxygen-containing environment, preferably in an oxygen-containing environment, more preferably under air.

At the end of step b), the starting feedstock is in the form of a liquid mass, which can possibly contain a few solid particles, but in an insufficient amount for them to be able to structure said mass. By definition, in order to keep its shape, a liquid mass must be contained within a container.

In a first embodiment, step c) comprises the following steps:
$c_1$) dispersing the liquid mass in the form of liquid droplets,
$c_2$) solidifying these liquid droplets by contact with a fluid, preferably an oxygen-containing fluid, so as to obtain fused particles.

By simple adjustment of the composition of the starting feedstock, conventional dispersing processes, in particular by blowing or spray drying, thus make it possible to produce, starting from a liquid mass, particles exhibiting a content of brownmillerite phase of greater than 50%, preferably greater than 60%, preferably greater than 70%, preferably greater than 80%, preferably greater than 90%, or even greater than 95%. The fused product according to the invention, in particular produced according to this first embodiment, can be, at the end of step c), in the form of particles having a size of less than 5 mm, or even less than 1 mm, or even less than 500 μm, or even less than 200 μm, or even less than 100 μm.

In the step $c_1$), a thin stream of the molten liquid, at a temperature of preferably greater than the melting point of the product according to the invention, preferably greater than 1400° C., is dispersed into liquid droplets.

The dispersion can result from blowing through the thin stream of the liquid mass. However, any other process for spray-drying a liquid mass, known to those skilled in the art, can be envisioned.

In step $c_1$), said liquid mass is brought into contact with a fluid, preferably an oxygen-containing fluid, preferably a gas, preferably air. The oxygen-containing fluid preferably has an oxygen volume content of greater than 20% by volume.

In step $c_2$), the liquid droplets are transformed into solid particles by contact with an oxygen-containing fluid, preferably a gas, preferably air. The oxygen-containing fluid preferably has an oxygen volume content of greater than 20% by volume.

Preferably, the process is adapted such that, as soon as it is formed, the molten liquid droplet is in contact with the oxygen-containing fluid. Again preferably, the dispersion (step $c_1$)) and the solidification (step $c_2$)) are substantially simultaneous, the liquid mass being dispersed by an oxygen-containing fluid, preferably a gas, preferably air, capable of cooling and solidifying this liquid.

Preferably, the contact with the oxygen-containing fluid is maintained at least until complete solidification of the droplets.

Air blowing at ambient temperature is possible.

At the end of step $c_2$), solid particles which have a size of between 0.01 mm and 5 mm are generally obtained, as a function of the dispersion conditions.

In a second embodiment, step c) comprises the following steps:
$c_1'$) casting the liquid mass in a mold;
$c_2'$) solidifying by cooling the liquid mass cast in the mold until an at least partly solidified block is obtained;
$c_3'$) removing the block from the mold.

In step $c_1'$), the liquid mass is cast in a mold capable of withstanding the bath of molten liquid. Preferably, molds made of graphite, made of cast iron, or as defined in U.S. Pat. No. 3,993,119 are used. In the case of an induction furnace, the turn is considered to constitute a mold. The casting is preferably carried out under air.

In step $c_2'$), the liquid mass cast in the mold is cooled until an at least partly solidified block is obtained.

Preferably, during the solidification, the liquid mass is brought into contact with a fluid, preferably an oxygen-containing fluid, preferably a gaseous fluid, preferably with air. This bringing into contact can be carried out as soon as the casting is carried out. However, it is preferable to begin this bringing into contact only after the casting has been carried out. For practical reasons, the bringing into contact with the oxygen-containing fluid preferably only begins after removal from the mold, preferably as early as possible after removal from the mold.

The oxygen-containing fluid preferably comprises at least 20% by volume of oxygen.

Preferably, the contact with the oxygen-containing fluid is maintained until complete solidification of the block.

In step $c_3'$), the block is removed from the mold. In order to facilitate the bringing of the liquid mass into contact with an oxygen-containing fluid, it is preferable to remove the block from the mold as rapidly as possible, if possible before complete solidification. Thus, the solidification then continues in step $c_3'$).

Preferably, the block is removed from the mold as soon as it has sufficient rigidity to substantially maintain its shape, and the bringing into contact with the oxygen-containing fluid is then immediately begun.

After complete solidification, a block capable of giving, after step d), a powder of particles according to the invention is obtained.

In an optional step d), the fused product obtained is crushed and/or ground so as to reduce the size of the pieces, preferably until a powder of fused particles having a median size Do of less than 4 mm, less than 3 mm, less than 2 mm, less than 1 mm, less than 0.5 mm, less than 0.25 mm, less than 0.1 mm and preferably greater than 0.1 µm is obtained. All types of crushers and mills can be used to reduce the size of the pieces. In particular, when a powder of fused particles having a median size $D_{50}$ of less than 1 µm is sought, an attrition mill can be used after having performed a first grinding operation in an air jet mill or in a ball mill. Preferably, when the grinding is carried out in a wet medium, water is not used. Preferably, an alcohol is used, preferably an ethanol and/or a propanol.

When powders of fused particles having a median size $D_{50}$ of greater than 1 µm are sought, an air jet mill or a ball mill is preferably used.

If necessary, a particle size selection is then carried out, as a function of the intended application, for example by sieving, in particular in such a way that the particle powder obtained has in particular a median size of greater than 0.1 µm and less than 4 mm.

The powder of fused particles may also undergo, in particular after step d), an additional step intended to form spray-dried particles, agglomerates or aggregates.

All the techniques known to those skilled in the art can be used, in particular spray drying of a slip or granulation.

A product according to the invention, in particular produced according to a process according to the invention, can have a composition which has one or more of the following characteristics:

- preferably, the content of brownmillerite phase, that is to say the weight percentage of brownmillerite phase(s) on the basis of all of the crystalline phases present in the fused product, is greater than 50%, preferably greater than 55%, preferably greater than 60%, preferably greater than 70%, preferably greater than 80%, preferably greater than 85%, or even greater than 90%, or even greater than 95%, or even greater than 98%;
- preferably, $y \geq 0.8$, preferably $y \geq 0.85$, preferably $y \geq 0.9$ and/or $y \leq 1.05$, preferably $y \leq 1$;
- preferably, $z \leq 0.2$, preferably $z \leq 0.15$, preferably $z \leq 0.1$ and/or $z \geq 0.01$;
- in one embodiment, $z=0$;
- preferably, $y+z \leq 1.1$, preferably $y+z \leq 1.05$;
- preferably, $t \geq 0.5$, preferably $t \geq 0.55$, preferably $t \geq 0.6$, preferably $t \geq 0.65$, preferably $t \geq 0.7$, preferably $t \geq 0.75$, preferably $t \geq 0.8$, preferably $t \geq 0.85$, preferably $t \geq 0.90$, and/or $t \leq 1.05$, preferably $t \leq 1$;
- preferably, $u \leq 0.5$, preferably $u \leq 0.45$, preferably $u \leq 0.4$, preferably $u \leq 0.35$, preferably $u \leq 0.3$, preferably $u \leq 0.25$, preferably $u \leq 0.2$, preferably $u \leq 0.15$, preferably $u \leq 0.1$, preferably $u \leq 0.08$, preferably $u \leq 0.05$ and/or $u \geq 0.01$;
- in one embodiment, $u=0$;
- in one embodiment, $z=0$ and $u=0$;
- preferably, $t+u \leq 1.1$, preferably $t+u \leq 1.05$;
- preferably, $X=Ca_{(1-x)}Sr_x$, with $0 \leq x \leq 1$. Preferably, $x \leq 0.1$, preferably $x \leq 0.05$, the stability of the brownmillerite phase, in particular during use in catalysis is advantageously improved therein, or preferably $x \geq 0.9$, preferably $x \geq 0.95$, the catalytic performance qualities thereof are advantageously improved. In one embodiment, $0<x<1$. In an alternative embodiment, $x=0$. In another embodiment, $x=1$;
- in one particular embodiment, more than 80%, preferably more than 85%, preferably more than 90%, preferably more than 95% of the total atomic proportion z of element M consists of a single atomic species;
- preferably, the element M' is chosen from Ti, Cu, Ni, Co, Mn and mixtures thereof;
- preferably, the sum of the atomic indices of Ti and Cu is less than or equal to 0.08, preferably less than or equal to 0.07, preferably less than or equal to 0.05;
- in one particular embodiment, more than 80%, preferably more than 85%, preferably more than 90% of the total atomic proportion u of element M' consists of one or two atomic species, preferably of just one atomic species;
- preferably, the total weight content of elements other than Ca, Sr, Fe, M, M' and O is less than 4%, preferably less than 3%, preferably less than 2%, preferably less than 1%, preferably less than 0.7%, preferably less than 0.4%, as a percentage on the basis of the weight of the product;
- in one embodiment, $x=0$, $y=1$, $z=0$, $t=1$ and $u=0$;
- in one embodiment, $x=1$, $y=1$, $z=0$, $t=1$ and $u=0$;
- in one embodiment, $0<x<1$, $y=1$, $z=0$, $t=1$ and $u=0$.

M and/or M' can be introduced into the starting feedstock to be melted as traces in a starting material. The atomic indices z and u take into account these additions.

In one particular embodiment:
- $x \leq 0.1$, preferably $x \leq 0.05$, and $x>0$, and
- $y \geq 0.9$ and $y \leq 1.05$, preferably $y \leq 1$, and
- $z \leq 0.1$ and $z \geq 0.01$, and
- $y+z \leq 1.1$, preferably $y+z \leq 1.05$, and
- $t \geq 0.8$, preferably $t \geq 0.85$, preferably $t \geq 0.90$ and $t \leq 1.05$, preferably $t \leq 1$, and
- $u \leq 0.2$, preferably $u \leq 0.15$, preferably $u \leq 0.1$, preferably $u \leq 0.08$, preferably $u \leq 0.07$, preferably $u \leq 0.05$ and $u \geq 0.01$, and
- $t+u \leq 1.1$, preferably $y+z \leq 1.05$, and
- the total weight content of elements other than Ca, Sr, Fe, M, M' and O is less than 3%, preferably less than 2%, preferably less than 1%, preferably less than 0.7%, preferably less than 0.4%, as a percentage on the basis of the weight of the product.

In one particular embodiment:
- $x=0$, and
- $y \geq 0.9$ and $y \leq 1.05$, preferably $y \leq 1$, and
- $z \leq 0.1$ and $z \geq 0.01$, and
- $y+z \leq 1.1$, preferably $y+z \leq 1.05$, and
- $t \geq 0.8$, preferably $t \geq 0.85$, preferably $t \geq 0.90$ and $t \leq 1.05$, preferably $t \leq 1$, and
- $u \leq 0.2$, preferably $u \leq 0.15$, preferably $u \leq 0.1$, preferably $u \leq 0.08$, preferably $u \leq 0.07$, preferably $u \leq 0.05$ and $u \geq 0.01$, and
- $t+u \leq 1.1$, preferably $y+z \leq 1.05$, and
- the total weight content of elements other than Ca, Sr, Fe, M, M' and O is less than 3%, preferably less than 2%, preferably less than 1%, preferably less than 0.7%, preferably less than 0.4%, as a percentage on the basis of the weight of the product.

In one particular embodiment:
- $x \geq 0.9$, preferably $x \geq 0.95$, and
- $y \geq 0.9$ and $y \leq 1.05$, preferably $y \leq 1$, and
- $z \leq 0.1$ and $z \geq 0.01$, and
- $y+z \leq 1.1$, preferably $y+z \leq 1.05$, and
- $t \geq 0.8$, preferably $t \geq 0.85$, preferably $t \geq 0.90$ and $t \leq 1.05$, preferably $t \leq 1$, and
- $u \leq 0.2$, preferably $u \leq 0.15$, preferably $u \leq 0.1$, preferably $u \leq 0.08$, preferably $u \leq 0.07$, preferably $u \leq 0.05$ and $u \geq 0.01$, and
- $t+u \leq 1.1$, preferably $y+z \leq 1.05$, and
- the total weight content of elements other than Ca, Sr, Fe, M, M' and O is less than 3%, preferably less than 2%, preferably less than 1%, preferably less than 0.7%, preferably less than 0.4%, as a percentage on the basis of the weight of the product.

In one particular embodiment:
x=1, and
y≥0.9 and y≤1.05, preferably y≤1, and
z≤0.1 and z≥0.01, and
y+z≤1.1, preferably y+z≤1.05, and
t≥0.8, preferably t≥0.85, preferably t≥0.90 and t≤1.05, preferably t≤1, and
u≤0.2, preferably u≤0.15, preferably u≤0.1, preferably u≤0.08, preferably u≤0.07, preferably u≤0.05 and u≥0.01, and
t+u≤1.1, preferably y+z≤1.05, and
the total weight content of elements other than Ca, Sr, Fe, M, M' and O is less than 3%, preferably less than 2%, preferably less than 1%, preferably less than 0.7%, preferably less than 0.4%, as a percentage on the basis of the weight of the product.

The determination of the atomic indices of a fused product according to the invention is carried out in the following way:

The weight content of each element except the oxygen is measured by chemical analysis. The weight content of oxygen, $Q_o$, is considered to constitute the remainder making up 100%. The elements other than Ca, Sr, Fe, M and M' are expressed in the form of their most stable respective oxide if such an oxide exists, or in the elemental form if this is not the case. For example, the amount of sodium is expressed in the form $Na_2O$, and the amount of chlorine or fluorine is equal to the weight content of Cl or F, respectively. The amount of oxygen required to express the weight contents of the elements other than Ca, Sr, Fe, M and M', in the form of the most stable oxides, $Q'_o$, is subtracted from the weight content of oxygen, $Q_o$. $Q_o-Q'_o$ and the weight contents of Ca, Sr, Fe, M and M', are converted into number of moles. The number of moles of $Q_o-Q'_o$ is standardized to 2.5. The number of moles of Ca, Sr, Fe, M and M' is multiplied by the factor having allowed said standardization to 2.5, which makes it possible to determine the indices x, y, z, t and u of the formula $[Ca_{(1-x)}Sr_x]_yM_zFe_tM'_uO_{2.5}$.

The fused product according to the invention can advantageously have varied dimensions. It is therefore perfectly suitable for industrial production.

A product according to the invention can in particular be in the form of a particle.

The invention also relates to a powder comprising more than 90% by weight, or even more than 95%, or even substantially 100% of particles as a product according to the invention. The median size of the powder is preferably greater than 0.1 μm and/or less than 4 mm, less than 3 mm, less than 2 mm, less than 1 mm, less than 0.5 mm, less than 0.25 mm, less than 0.1 mm.

In one particular embodiment, the median size of the powder is between 0.5 μm and 50 μm.

In one embodiment, the powder according to the invention comprises spray-dried material, conventionally in the form of granules, and/or aggregates and/or agglomerates of particles according to the invention.

A product according to the invention, in particular in the form of a powder, or produced or that can be produced by means of a process according to the invention can advantageously be used for producing an oxygen separation membrane, a catalytic membrane, an electrode for a solid oxide fuel cell, a catalyst support, a catalyst.

EXAMPLES

The following examples are given for illustrative purposes and do not limit the invention.

The products of examples 1 and 2, which are comparative examples, are produced chemically in the following way.

For each of examples 1 and 2, the mixture of salts that is defined in the following table 1 is introduced into distilled water, and the pH is kept below 1 by addition of anhydrous citric acid.

TABLE 1

| Example | $Ca(NO_3)_2 \cdot 4H_2O$ | $Sr(NO_3)_2$ | $Fe(NO_3)_3 \cdot 9H_2O$ |
|---|---|---|---|
| 1(*) | 1.76 | — | 3.04 |
| 2(*) | — | 1.15 | 2.20 |

(*)outside the invention

After 3 hours of stirring using a magnetic stirrer, the pH is brought to a value equal to 3 by addition of aqueous ammonia, then the mixture is brought to 110° C. so as to evaporate off the water. When the gel begins to form, 1 ml of ethylene glycol is added. After a stirring time of 30 minutes using a magnetic stirrer, the gel formed is brought to a temperature equal to 370° C. for a holding time at this temperature equal to 2 hours by means of a hotplate. The powder thus obtained is then calcined in an electric furnace at 600° C. for 6 hours, under air, with a temperature increase rate to this temperature equal to 100° C./h.

The fused products of examples 3 and 4 were produced in the following way.

The following initial starting materials were first intimately mixed in a mixer:
for examples 3 and 4, an iron oxide powder comprising more than 99% by weight of $Fe_2O_3$, the median size of which is equal to 0.34 μm;
for example 3, a powder comprising more than 99% by weight of calcium carbonate $CaCO_3$, the median size of which is equal to 1.85 μm;
for example 4, a powder comprising more than 99% by weight of strontium carbonate $SrCO_3$, the median size of which is equal to 4.3 μm.

For each of examples 3 and 4, the starting feedstock is defined in the following table 2, as weight percentages:

TABLE 2

| Example | $CaCO_3$ | $SrCO_3$ | $Fe_2O_3$ |
|---|---|---|---|
| 3 | 55.6 | — | 44.4 |
| 4 | — | 64.9 | 35.1 |

For each example, the starting feedstock having a weight of 5 kg was poured into a Heroult arc melting furnace. It was then melted according to melting with a voltage of 120 volts and an applied energy substantially equal to 2000 kWh/T, in order to completely and uniformly melt all the mixture.

Then, when the melting was complete, the molten liquid was cast so as to form a thin stream.

Blowing of compressed dry air, at ambient temperature and at an overpressure of 3 bar, broke the thin stream and dispersed the molten liquid into droplets.

The blowing cooled these droplets and set them in the form of fused particles.

The fused particles of examples 3 and 4 were received in a container.

The chemical analyses were carried out on calcined samples for 2 hours at 1000° C.

The chemical analysis was carried out by X-ray fluorescence on a bead of the product to be analyzed, produced by fusing said product with lithium borate.

The determination of the content of brownmillerite phase was carried out on samples which had, after dry grinding, a median size of less than 40 µm.

The specific surface area is measured by the BET (Brunauer Emmet Teller) method described in the Journal of American Chemical Society 60 (1938), pages 309 to 316. The median size is measured using a Partica LA-950 laser particle size analyzer from the company Horiba.

Tables 3 and 4 below summarize the results obtained.

TABLE 3

| Ex. | Ca $(1 - x) \cdot y$ | Sr $x \cdot y$ | Fe $t$ | M $z$ | M' $u$ | Others (% by weight) |
|---|---|---|---|---|---|---|
| 1(*) | 0.99 | 0 | 1.00 | 0 | 0 | 0.00 |
| 2(*) | 0 | 0.96 | 1.02 | 0 | 0 | 0.00 |
| 3 | 0.96 | 0 | 1.02 | 0 | 0 | 0.11 |
| 4 | 0 | 1.02 | 0.97 | 0 | 0 | 0.05 |

(*)outside the invention

TABLE 4

| Example | Content of brownmillerite phase | Secondary phases |
|---|---|---|
| 1(*) | 95 | $CaO/Fe_2O_3/CaCO_3$ |
| 2(*) | 43 | $SrFeO_{2.75}/SrFeO_{2.875}/SrCO_3/Fe$ |
| 3 | 97 | $Fe_2O_3/FeO/Fe$ |
| 4 | 58 | $SrFeO_{2.75}/SrFeO_{2.875}/SrCO_3/Fe$ |

(*)outside the invention

The X-ray diffraction patterns of the products of examples 3 and 4 do not show, at low angles, a halo characteristic of the presence of an amorphous phase.

The products of the examples were then ground for 72 hours in a jar mill at a rotation speed equal to 60 rpm, the volume of the jar being equal to 0.9 liter, into which were introduced 1.4 kg of cylpebs made of zirconia doped with 3% by weight of MgO having a dimension equal to 12.7 mm and 650 grams of the product of the example. After separation of the cylpebs, 40 g of the powder recovered are then ground in an attrition mill for 75 minutes at 1000 rpm, the tank with a volume equal to 0.89 liter also containing 680 g of beads of zirconia yttriated at 3 mol % having a median size equal to 0.8 mm, and 200 ml of isopropanol. The characteristics of the powders obtained are summarized in the following table 5.

TABLE 5

| Ex | Median size (µm) | Specific surface area (m$^2$/g) |
|---|---|---|
| 1(*) | 0.56 | 12 |
| 2(*) | 0.56 | 13 |
| 3 | 1.2 | <1 |
| 4 | 1 | <1 |

(*)outside the invention

The powders of examples 1 and 2, outside the invention, and 3 and 4, according to the invention, were used in the production of catalytic systems as a catalyst support, platinum being used as catalyst, the weight amount of platinum being substantially equal to 0.99%, on the basis of the weight of the catalyst support and of the platinum.

The preparation of the catalytic systems was carried out by impregnation of the powder of each example with a solution of platinum nitrate $Pt(NO_3)_2$. This method, which is simple to carry out, is well known to those skilled in the art. After suspending the powder in the platinum nitrate solution, the latter is left in an ultrasound bath for 30 minutes at ambient temperature. The various powders impregnated are dried in a rotary evaporator at 47° C. at a pressure of 130 mbar for 3 h. The various powders impregnated are then calcined under air at 500° C. for a holding time at this temperature equal to 2 hours, with a temperature increase rate equal to 10° C./min and a decrease at an uncontrolled rate.

After calcination, the powders are compacted on a hand press so as to form a pellet. The pellet is then broken using a pestle and mortar, and the powder obtained is sieved so as to recover the catalytic system corresponding to the fraction of powder which has not passed through a sieve with square meshes having an opening equal to 125 µm and which passes through a sieve with square meshes having an opening equal to 250 µm.

Catalytic tests were then carried out with each catalytic system, on a reaction for oxidation of carbon monoxide to carbon dioxide ($CO + \frac{1}{2} O_2 \rightarrow CO_2$), in a quartz fixed-bed flow-through open reactor, and at atmospheric pressure, according to the following procedure: 200 mg of the catalytic system (in the case in point the powder of examples 1*, 2*, 3 and 4, impregnated with platinum) are placed in the reactor. A first step of reducing the powders consists in injecting a stream of 10 l/h of a mixture of 40% hydrogen and 60% argon by volume in a cycle having an increase rate equal to 10° C./min up to a temperature equal to 300° C. and a hold at this temperature equal to 1 hour. The temperature decrease is carried out under helium at the rate of inertia of the furnace down to ambient temperature.

A first catalytic cycle is carried out, consisting of an increase at a rate equal to 2° C./min up to a temperature equal to 350° C., a hold at 350° C. for 10 minutes, then a decrease to ambient temperature at the rate of inertia of the reactor. During the increase and the stationary phase at 350° C., a reaction mixture of 6000 ppm of CO and of 10 000 ppm of oxygen diluted in helium is injected into the reactor at an overall flow rate equal to 10 l/h. The decrease is carried out under helium, the helium flow rate being equal to 1 l/h.

The degree of conversion of the carbon monoxide to carbon dioxide, as %, is defined as the ratio of the amount of carbon monoxide having reacted to the amount of carbon monoxide introduced into the reactor, the amount of carbon monoxide having reacted being equal to the amount of carbon monoxide introduced into the reactor reduced by the amount of unreacted carbon monoxide leaving the reactor. The amount of unreacted carbon monoxide leaving the reactor and the amount of carbon dioxide leaving the reactor are measured throughout the catalytic cycle by means of micro gas chromatography with a thermal conductivity detector, equipped with two parallel columns, and at a rate of sampling every 235 seconds.

A second catalytic cycle, then a third catalytic cycle are carried out under the same conditions.

The following table 6 groups together the results obtained:

TABLE 6

| Powder used as catalyst support in the catalytic system | Temperature at which a degree of conversion of carbon monoxide to carbon dioxide equal to 50% is achieved in the first cycle (° C.) | Temperature at which a degree of conversion of carbon monoxide to carbon dioxide equal to 50% is achieved in the third cycle (° C.) |
|---|---|---|
| Ex1(*) | 221 | 240 |
| Ex2(*) | 202 | 247 |
| Ex3 | 187 | 201 |
| Ex4 | 197 | 196 |

(*)Comparative example outside the invention

A comparison of example 1 (outside the invention) and example 3 (according to the invention), for which X=Ca, shows a degree of conversion equal to 50% achieved at a temperature of 187° C. for example 3 and of 221° C. for example 1 in the first catalytic cycle and a degree of conversion equal to 50% achieved at a temperature of 201° C. for example 3 and of 240° C. for example 1 in the third catalytic cycle.

A comparison of example 2 (outside the invention) and example 4 (according to the invention), for which X=Sr, shows a degree of conversion equal to 50% achieved at a temperature of 197° C. for example 4 and of 202° C. for example 2 in the first catalytic cycle and a degree of conversion equal to 50% achieved at a temperature of 196° C. for example 4 and of 247° C. for example 2 in the third catalytic cycle.

These results show that a high degree of conversion of carbon monoxide to carbon dioxide is achieved at a lower temperature with a catalytic system obtained from a powder derived from a polycrystalline fused product according to the invention, thus making it possible to obtain a very good conversion efficiency at lower temperatures than with the powders of the examples outside the invention.

As is clearly apparent at the current time, the powder according to the invention makes it possible to improve the catalytic performance qualities.

Of course, the present invention is not limited to the described embodiments provided by way of illustrative and nonlimiting examples.

In particular, it is obvious for those skilled in the art that the introduction, into the structures described, of another cationic element M and/or M' according to the invention, as described above, will result in the same catalytic performance qualities as those described above, provided that the fused product obtained retains this same brownmillerite structure.

The invention claimed is:

1. A polycrystalline fused product based on brownmillerite, consisting, for more than 95% of its weight, of the elements Ca, Sr, Fe, O, M and M', the contents of said elements being defined by the formula $X_yM_zFe_tM'_uO_{2.5}$, wherein the atomic indices are such that $0.76 \leq y \leq 1.10$, $z \leq 0.21$, $0.48 \leq t \leq 1.10$ and $u \leq 0.52$, $0.95 \leq y+z \leq 1.10$, and $0.95 \leq t+u \leq 1.10$, X being Ca or Sr or a mixture of Ca and Sr, M being an element chosen from the group formed by La, Ba and mixtures thereof, M' being an element chosen from the group formed by Ti, Cu, Gd, Mn, Al, Sc, Ga, Mg, Ni, Zn, Pr, In, Co, and mixtures thereof, the sum of the atomic indices of Ti and Cu being less than or equal to 0.1.

2. The fused product as claimed in claim 1, wherein $0.85 \leq y \leq 1.05$ and/or $z \leq 0.15$ and/or $0.75 \leq t \leq 1.05$ and/or $u \leq 0.25$.

3. The fused product as claimed in claim 1, wherein the content of brownmillerite phase is greater than 50%.

4. The fused product as claimed in claim 1, wherein $z=0$.

5. The fused product as claimed in claim 1, wherein $u=0$.

6. The fused product as claimed in claim 1, wherein $z=0$ and $u=0$.

7. The fused product as claimed in claim 1, wherein the element M' is chosen from Ti, Cu, Ni, Co, Mn and mixtures thereof.

8. The fused product as claimed in claim 1, of formulation $X_yM_zFe_tM'_uO_{2.5}$, wherein, if x represents the proportion of Sr and (1−x) the relative proportion of Ca in the formula $(Ca_{(1-x)}Sr_x)_yM_zFe_tM'_uO_{2.5}$, $0<x \leq 0.1$, $0.9 \leq y \leq 1.05$, $0.1 \geq z \geq 0.01$, $y+z \leq 1.1$, $t \geq 0.8$, $0.01 \leq u \leq 0.2$, $t+u \leq 1.1$, and the total weight content of elements other than Ca, Sr, Fe, M, M' and O is less than 3% as a percentage on the basis of the weight of the product.

9. The fused product as claimed in claim 1, of formulation $X_yM_zFe_tM'_uO_{2.5}$, wherein, if x represents the proportion of Sr and (1−x) the relative proportion of Ca in the formula $(Ca_{(1-x)}Sr_x)_yM_zFe_tM'_uO_{2.5}$, $x=0$, $0.9 \leq y \leq 1.05$, $0.1 \geq z \geq 0.01$, $y+z \leq 1.1$, $t \geq 0.8$, $0.01 \leq u \leq 0.2$, $t+u \leq 1.1$, and the total weight content of elements other than Ca, Sr, Fe, M, M' and O is less than 3% as a percentage on the basis of the weight of the product.

10. The fused product as claimed in claim 1, wherein, if x represents the proportion of Sr and (1−x) the relative proportion of Ca in the formula $(Ca_{(1-x)}Sr_x)_yM_zFe_tM'_uO_{2.5}$, $1>x \geq 0.9$, $0.9 \leq y \leq 1.05$, $0.1 \geq z \geq 0.01$, $y+z \leq 1.1$, $t \geq 0.8$, $0.01 \leq u \leq 0.2$, $t+u \leq 1.1$, and the total weight content of elements other than Ca, Sr, Fe, M, M' and O is less than 3% as a percentage on the basis of the weight of the product.

11. The fused product as claimed in claim 1, wherein, if x represents the proportion of Sr and (1−x) the relative proportion of Ca in the formula $(Ca_{(1-x)}Sr_x)_yM_zFe_tM'_uO_{2.5}$, $x=1$, $0.9 \leq y \leq 1.05$, $0.1 \geq z \geq 0.01$, $y+z \leq 1.1$, $t \geq 0.8$, $0.01 \leq u \leq 0.2$, $t+u \leq 1.1$, and the total weight content of elements other than Ca, Sr, Fe, M, M' and O is less than 3% as a percentage on the basis of the weight of the product.

12. A powder comprising more than 90% by weight of particles in a fused product as claimed in claim 1.

13. The powder as claimed in claim 12, having a median size $D_{50}$ of greater than 0.1 μm and less than 4 mm.

14. A process for producing a fused product as claimed in claim 1, comprising:
   a. mixing starting materials so as to form a starting feedstock suitable for obtaining, at the end of step c), said fused product,
   b. melting the starting feedstock until a liquid mass is obtained,
   c. cooling until complete solidification of said liquid mass, so as to obtain said fused product.

15. A catalytic support or a catalyst comprising or consisting of a fused product as claimed in claim 1.

16. An oxygen separation membrane comprising or consisting of a fused product as claimed in claim 1.

17. An electrode for a solid oxide fuel cell SOFC comprising or consisting of a fused product as claimed in claim 1.

* * * * *